Aug. 17, 1954     C. F. ERIKSON     2,686,428
LIQUID LEVEL GAUGE
Filed June 1, 1950
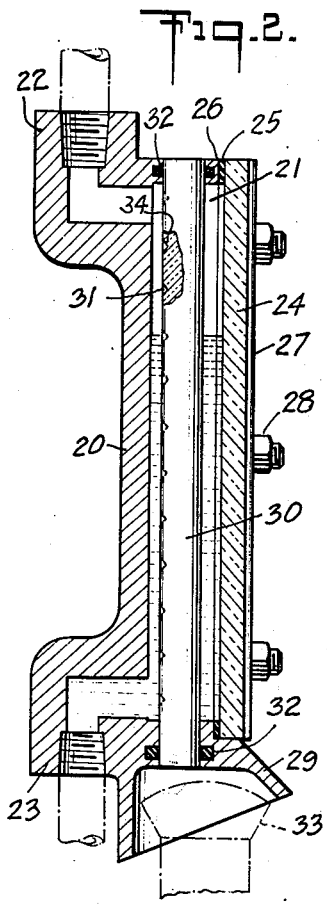
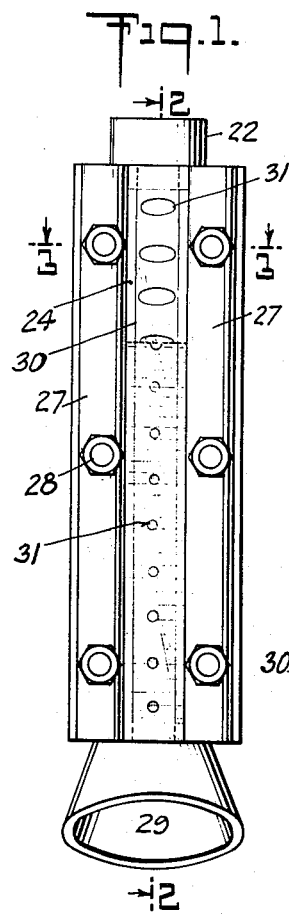
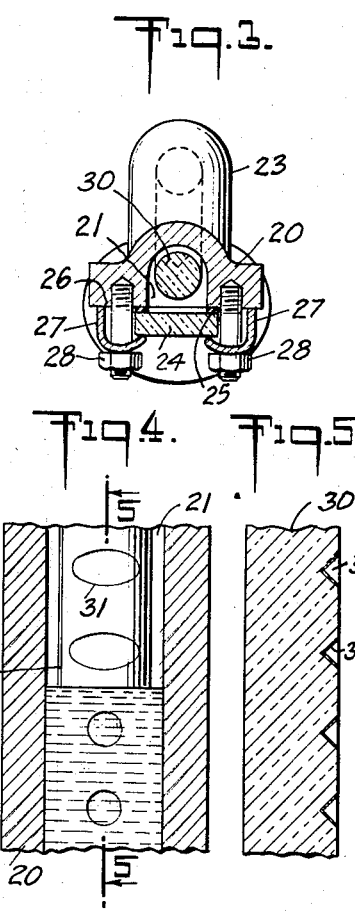
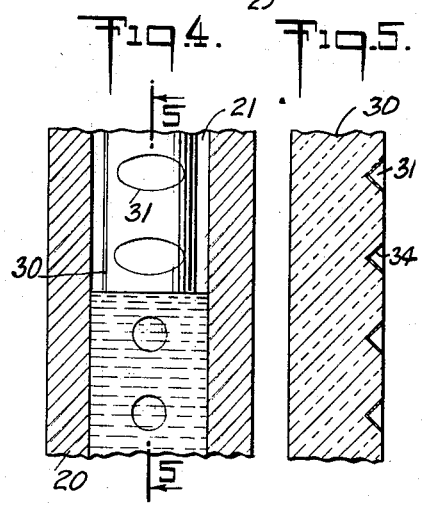
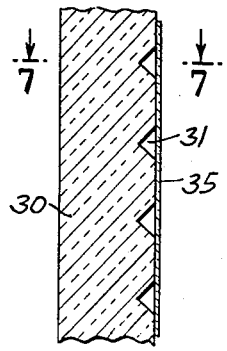
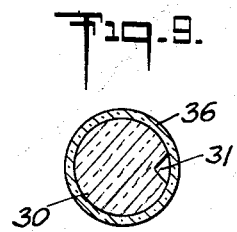
INVENTOR
CARL F. ERIKSON
BY Walter E. Wollheim
ATTORNEY Patented Aug. 17, 1954

2,686,428

UNITED STATES PATENT OFFICE 2,686,428

LIQUID LEVEL GAUGE

Carl F. Erikson, White Plains, N. Y., assignor, by mesne assignments, to Nathan Manufacturing Corp., a corporation of New York Application June 1, 1950, Serial No. 165,426

6 Claims. (Cl. 73—293)

The invention refers particularly to a liquid level gauge which is adapted to be attached to a tank and in which a light conducting medium is disposed within a chamber in the gauge wherein the level of the liquid in the tank can be observed through a transparent plate or the like and in which the light conducting medium is, preferably, surrounded by the liquid in the chamber in which the level of the liquid corresponds to that of the liquid in the tank. The instant invention has reference to indentations in the light conducting medium which appear differently above and below the liquid when viewed through the transparent plate as disclosed in detail in my co-pending application, Serial No. 136,225, that matured into Patent 2,514,570, dated July 11, 1950, of which this application is a continuation-in-part.

It is the principal object of the invention to provide the aforesaid indentations with means which prevent direct contact between the liquid and the indentations. This causes rays of light from an illuminating source at the end of the rod to be more brightly reflected from the indentations toward the observer and make the level of the liquid more readily noticeable. In rods where no such means are provided for the indentations and when they are filled with the liquid some of the rays of light pass through the liquid and diminish the reflecting characteristics of the indentations. This is particularly true in applications in which the level of the liquid fluctuates rapidly and the reflecting effect is reduced until the liquid is drained out of the indentations.

The invention will be more clearly understood by reference to the following description in connection with the accompanying drawings which illustrate the preferred embodiments of the invention and in which Fig. 1 is a front elevational view of a gauge embodying the principles of the invention;

Fig. 2 is a vertical sectional view along the plane of line 2—2 in Fig. 1;

Fig. 3 is a horizontal sectional view along the plane of line 3—3 in Fig. 1;

Fig. 4 is an enlarged fragmentary vertical sectional view, partly in elevation, showing the light conducting medium surrounded partly by a liquid in the gauge, with a transparent front cover of the gauge removed, indicating on the medium the different appearance of the marking above and below the level of the liquid when viewed through the front cover;

Fig. 5 is a sectional view along the plane of line 5—5 in Fig. 4, showing the light-conducting medium with one form of spacing means between indentations on the medium and the liquid;

Fig. 6 is a sectional view similar to Fig. 5 showing another form of spacing means;

Fig. 7 is a horizontal sectional view along the plane of line 7—7 in Fig. 6;

Fig. 8 is a sectional view similar to Fig. 5 showing still another form of spacing means; and Fig. 9 is a horizontal sectional view along the plane of line 9—9 in Fig. 8.

Like characters of reference denote similar parts throughout the several views and the following specification.

Referring more particularly now to Figs. 1, 2 and 3, 20 is a gauge body having an open chamber 21, connections 22 and 23 at the top and bottom, respectively, to be attached to pipes in communication with a tank, the contents of which are to be observed in the gauge. 24 is a transparent plate and 25 a gasket at its marginal portions held fluidtightly against a face 26 surrounding the opening of the chamber 21 by means of frontal strips 27 and bolts and nuts 28. The bottom of the gauge body 20 is extended in a funnel-like shape at 29 to form a light receiver.

30 is a light conducting medium made of a transparent rod of, preferably, round cross section made of "Lucite" or other suitable material. At the side of the rod facing the rear wall of the gauge are a number of round conically shaped indentations 31. The rod is inserted lengthwisely into the gauge, its lower end being located within the light receiver 29 and its upper end in the top of the gauge body 20. Packing rings 32 at the top and bottom hold the rod fluidtightly in the gauge. 33 shows in dotted lines the upper end of a manually carried flashlight adapted to be placed within the light receiver 29 and which serves as an illuminating means.

The gauge is applied to the tank by means of pipes screwed into connections 22 and 23. Pipes, of course could be omitted and the gauge body so arranged that its connections 22 and 23, instead of being right-angled, are fastened directly to the tank in any convenient manner. The length of the gauge may be either equal to the length of the tank, or of a length which makes it possible to observe the critical level in the tank.

The level of the liquid will be observed through the transparent plate 24. The indentations in the rod 30 appear perfectly round below the level of the liquid, while above it they are of an elongated shape as shown in Figs. 1 and 4 and made to appear so by that part of the round rod 30 above the liquid, the curved surface of which serves as a lens. In dark locations, or at night, holding a flashlight within the receiver 29, as indicated in dotted lines in Fig. 2, will project rays of light upwardly through the rod 30 and cause the lower halves of the indentations 31 to be illuminated by reflecting the rays of light from the lower halves forwardly.

The gauge shown and described so far, its details, and the manner of applying a source of light to one end of the light conducting rod, are subject to many changes all of which are brought out in aforesaid Patent 2,514,570.

I shall now describe the specific improvements made the subject of the instant application.

In Fig. 5 the indentations 31 are shown with spacing means preventing direct contact between the liquid and the portions of the rod defining the indentations. This means is in form of a coating 34 impervious to liquid. It may be opaque, and may be of a color, if desired, having reflective characteristics. In actual practice, it has been found that where the liquid contacts directly the portions of the rod defining the indentations, a certain amount of light rays projected upwardly from the bottom of rod 30 passes through the liquid and a lesser amount of rays is deflected forwardly from the indentations reducing the brilliancy of the markings, when viewed from the front of the gauge, considerably. This is especially objectionable when liquids of low viscosity, such as heavy oils, are to be observed. The round appearance of the markings below the liquid is then barely noticeable, and above the level of the liquid such oils adhere to the portions of the rod defining the indentations and absorb light rays until all the liquid is drained out of the indentations. This makes instant observations difficult particularly when the liquid in such gauges is subject to rapid fluctuations as, for instance, when applied to locomotives. With spacing means provided for the markings above and below the liquid is more brilliantly illuminated, because all the light rays are reflected forwardly making observations readily obtainable by the difference of appearance of the markings.

In Figs. 6 and 7 is shown another form of spacing means, namely, a strip 35 over the indentations made, preferably, of transparent material, such as "cellophane" or the like, impervious to liquids. This also prevents the liquid from entering the indentations and thus increases the brilliancy of the markings.

In Figs. 8 and 9 is shown still another form of spacing means which has been found especially well suited for the purpose. It consists of a transparent tube 36 over the light-conducting rod 30 which effectively seals the open ends of the indentations.

It is apparent that I have provided in gauges of the kind described simple means which greatly increase the brilliancy of the markings and thus cause observations to be more readily made under severe fluctuating conditions and with liquids of low viscosity.

It is obvious that other forms of spacing means may be employed for separating the liquid from the indentations without departing from the principles or sacrificing any of the advantages of the invention as defined in the appended claims.

What I claim as new is:

1. In a liquid level gauge having a chamber adapted to be placed in communication with a tank containing a liquid, one side wall of the chamber being transparent, a generally upstanding light-conducting rod in the chamber, one end of said rod being disposed to be illuminated at one end by a light source exterior the chamber, said rod having a curved face on the side thereof that is adapted to be seen by a viewer looking through the transparent wall and being further provided with indentations on the side thereof opposite said viewing side, and shielding means for overlying said indentations for preventing liquid from being admitted into the chamber from the tank and contacting directly the portions of the rod defining the indentations.

2. In a liquid level gauge according to claim 1, the shielding means comprising a transparent tube over the rod.

3. In a liquid level gauge according to claim 1, the shielding means comprising a strip of material impervious to liquids over the indentations.

4. In a liquid level gauge according to claim 1, the shielding means comprising a coating impervious to liquids over the portions of the rod defining the indentations.

5. In a liquid level gauge according to claim 1, the shielding means comprising an opaque coating impervious to liquids over the portions of the rod defining the indentations.

6. In a liquid level gauge according to claim 1, the shielding means comprising an opaque coating having reflective characteristics and being impervious to liquids over the portions of the rod defining the indentations.

References Cited in the file of this patent

UNITED STATES PATENTS

| Number | Name | Date |
|---|---|---|
| 2,095,558 | Oberacker | Oct. 12, 1937 |
| 2,289,374 | Martin | July 14, 1942 |
| 2,437,555 | Rees | Mar. 9, 1948 |
| 2,475,400 | Osborn | July 5, 1949 |
| 2,514,570 | Erikson | July 11, 1950 |

FOREIGN PATENTS

| Number | Country | Date |
|---|---|---|
| 396,091 | Great Britain | July 24, 1933 |